United States Patent
Li et al.

(10) Patent No.: US 10,305,086 B2
(45) Date of Patent: May 28, 2019

(54) TOP COVER OF POWER BATTERY AND POWER BATTERY

(71) Applicant: CONTEMPORARY AMPEREX TECHNOLOGY CO., LIMITED, Ningde (CN)

(72) Inventors: Quankun Li, Ningde (CN); Peng Wang, Ningde (CN); Pinghua Deng, Ningde (CN); Lingbo Zhu, Ningde (CN); Jian Guo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 315 days.

(21) Appl. No.: 15/394,629

(22) Filed: Dec. 29, 2016

(65) Prior Publication Data

US 2017/0373301 A1    Dec. 28, 2017

(30) Foreign Application Priority Data

Jun. 27, 2016 (CN) .......................... 2016 1 0482498

(51) Int. Cl.
*H01M 2/34* (2006.01)
*H01M 2/06* (2006.01)
(Continued)

(52) U.S. Cl.
CPC .......... *H01M 2/345* (2013.01); *H01M 2/043* (2013.01); *H01M 2/0473* (2013.01); *H01M 2/06* (2013.01);
(Continued)

(58) Field of Classification Search
CPC ......... H01M 2200/20; H01M 2220/20; H01M 2/043; H01M 2/0473; H01M 2/06; H01M 2/26; H01M 2/305; H01M 2/345
See application file for complete search history.

(56) References Cited

U.S. PATENT DOCUMENTS 6,296,965 B1 * 10/2001 Azema ................... H01M 2/34
                                                       429/57
6,403,250 B1 *  6/2002 Azema ............... H01M 2/1229
                                                       200/512
(Continued)

FOREIGN PATENT DOCUMENTS

CN          104577029 A      4/2015
CN          204614848 U      9/2015
(Continued)

OTHER PUBLICATIONS

From EP 16196244.4, Partial European Search Report, dated May 19, 2017.
(Continued)

*Primary Examiner* — Carlos Barcena
(74) *Attorney, Agent, or Firm* — Ladas & Parry, LLP

(57) ABSTRACT

This application provides a top cover of a power battery and a power battery, the top cover includes a top cover sheet, a first electrode unit and a second electrode unit, the first electrode unit includes a turning sheet, an insulating piece and a current cutting-off structure, the current cutting-off structure is fixed in radial projection range of an assembling hole and is electrically connected with the top cover sheet, the turning sheet is fixed at an underneath of the top cover sheet through the insulating piece, the turning sheet is electrically connected with the top cover sheet merely through the current cutting-off structure, and the turning sheet is capable of turning and breaking the current cutting-off structure when an internal pressure of the power battery exceeds a reference pressure, so as to cut off an electrical connection of the current cutting-off structure with the top cover sheet.

13 Claims, 4 Drawing Sheets

(51) Int. Cl.
    *H01M 2/30*     (2006.01)
    *H01M 2/26*     (2006.01)
    *H01M 2/04*     (2006.01)
    *H01M 2/12*     (2006.01)

(52) U.S. Cl.
    CPC ........... *H01M 2/1241* (2013.01); *H01M 2/26* (2013.01); *H01M 2/30* (2013.01); *H01M 2/305* (2013.01); *H01M 2200/20* (2013.01); *H01M 2220/20* (2013.01)

(56) References Cited

U.S. PATENT DOCUMENTS

| | | |
|---|---|---|
| 2005/0214641 A1 | 9/2005 | Kim |
| 2010/0247984 A1 | 9/2010 | Yamashita et al. |
| 2011/0206958 A1 | 8/2011 | Kiyama et al. |
| 2015/0079432 A1* | 3/2015 | Okuda ................. H01M 2/345 429/61 |
| 2016/0190657 A1* | 6/2016 | Hirose ................... H01M 2/06 429/7 |
| 2016/0268077 A1* | 9/2016 | Hirose ................... H01G 11/16 |
| 2016/0315308 A1 | 10/2016 | Hirose et al. |
| 2017/0077483 A1 | 3/2017 | Hirose et al. |

FOREIGN PATENT DOCUMENTS

| | | | |
|---|---|---|---|
| CN | 204946952 U | 1/2016 | |
| CN | 205692877 U | 11/2016 | |
| JP | H08339793 A | 12/1996 | |
| JP | 09055197 A * | 2/1997 | ......... H01M 2/1235 |
| JP | 2015/079616 A | 4/2015 | |
| JP | 2015/173070 A | 10/2015 | |
| WO | 2015/076137 A1 | 5/2015 | |
| WO | 2015/129404 A1 | 9/2015 | |

OTHER PUBLICATIONS

From EP 16196244.4, European Search Report and Search Opinion, dated Oct. 2, 2017.
From CN 201610482498.9, Office Action dated Feb. 5, 2018 with machine English translation from Global Dossier.

* cited by examiner

TOP COVER OF POWER BATTERY AND POWER BATTERY

CROSS-REFERENCE TO RELATED APPLICATIONS

The present application claims priority to Chinese Patent Application No. 201610482498.9, filed on Jun. 27, 2016, the content of which is incorporated herein by reference in its entirety.

TECHNICAL FIELD

The present application relates to the field of energy storage devices and, particularly, relates to a top cover of a power battery and a power battery.

BACKGROUND

In order to solve the over-charging problem of the EV hard shell battery, a general solution adopted in the industry is to cut off the main circuit before the cell loses efficacy, so as to prevent the battery from being charged continuously thereby ensuring safety of the battery.

At present, for a square shaped hard shell battery, a current interrupt device (Current Interrupt Device, CID) is generally adopted for overcharging protection. In addition, conventional current interrupt devices need to be used together with the turning sheet, therefore, the current interrupt device and the turning sheet are both arranged in the interior of the battery in relevant art. However, this will make that the current interrupt device and the turning sheet occupy larger internal space of the battery.

Considering an increasing high demand of the capacity density of the power battery now, there is an increasing demand of the utilization rate of the internal space of the battery.

In view of the above, it is necessary to design a structure that occupies as little internal space of the battery as possible.

SUMMARY

The present application provides a top cover of a power battery and a power battery, which can solve the above-mentioned problems.

The first aspect of the present application provides a top cover of a power battery, which includes a top cover sheet, a first electrode unit and a second electrode unit, the first electrode unit includes a turning sheet, an insulating piece and a current cutting-off structure, an assembling hole is provided on the top cover sheet, the current cutting-off structure is fixed in a radial projection range of the assembling hole, and is electrically connected with the top cover sheet, the turning sheet is fixed at an underneath of the top cover sheet through the insulating piece, the turning sheet is electrically connected with the top cover sheet merely through the current cutting-off structure, the second electrode unit is electrically insulated from the top cover sheet, and the turning sheet is capable of turning and breaking the current cutting-off structure when an internal pressure of the power battery exceeds a reference pressure, so as to cut off an electrical connection of the current cutting-off structure with the top cover sheet.

Preferably, the turning sheet directly contacts with a bottom of the current cutting-off structure.

Preferably, the current cutting-off structure seals the assembling hole.

Preferably, the insulating piece is sealed and fixed with the top cover sheet, and the turning sheet is sealed and fixed with the insulating piece.

Preferably, the first electrode unit further includes a sealing ring, in which, the sealing ring is provided between the insulating piece and the top cover sheet, and seals a gap between the insulating piece and the top cover sheet.

Preferably, the first electrode unit further includes a connecting plate, in which, the connecting plate covers the assembling hole and is electrically connected with the top cover sheet.

Preferably, a groove is provided at a bottom of the connecting plate, and the groove is opposite to the assembling hole.

Preferably, a projection of the assembling hole in a direction perpendicular to a thickness direction of the top cover sheet overlaps with or is located within a projection of the groove in a same direction.

Preferably, the turning sheet includes a fixing portion, a connecting convex head and a turning portion, the turning portion is a sheet shaped structure with a ring surface, the fixing portion is fixed and connected with an edge of the turning portion, the connecting convex head is located in the middle of the turning portion, protrudes toward a lower surface of the current cutting-off structure and contacts with the current cutting-off structure.

Preferably, the current cutting-off structure and the top cover sheet are integrally formed.

Preferably, the insulating piece is adhered to the top cover sheet.

Preferably, a connecting piece is also included, and the insulating piece is connected with the top cover sheet through the connecting piece.

Preferably, a connecting piece fitting portion is provided on the insulating piece and/or the top cover sheet, and the connecting piece is fitted and fixed with the connecting piece fitting portion.

Preferably, an inserting slot is provided on the insulating piece, and an edge of the turning sheet is inserted in the inserting slot and is sealed and connected with the inserting slot.

The second aspect of the present application provides a power battery, which includes a cell and the top cover of the power battery, the cell is electrically connected with the turning sheet.

The solutions provided by the present application have the following beneficial effects:

By providing the assembling hole and configuring the current cutting-off structure in the assembling hole, the power battery provided by the present application can reduce the occupation of internal space of the battery by the current cutting-off structure, so as to increase the energy density of the battery.

It should be interpreted that the general description above and the detailed description below are merely exemplary and cannot limit the present application.

REFERENCE SIGNS

Figure 1:
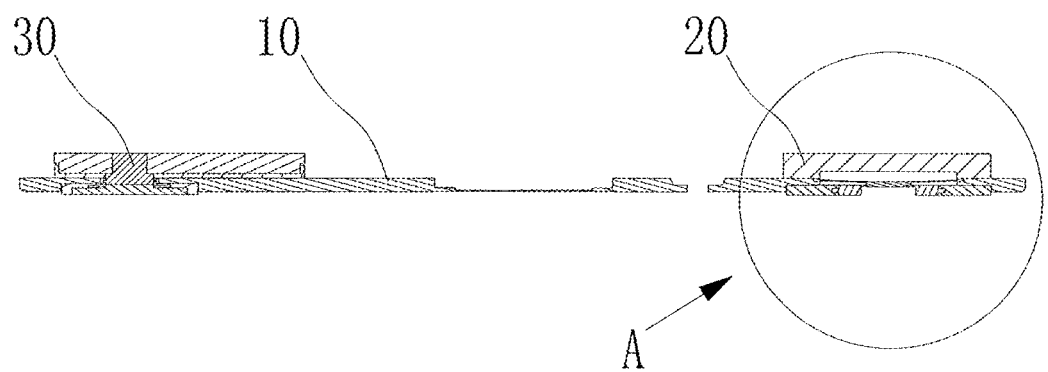
FIG. 1 is an integral side sectional view of a top cover of a power battery provided by an embodiment of the present application.

10—top cover sheet;
100—assembling hole;
20—first electrode unit;
200—insulating piece;
201—connecting piece;
203—sealing ring;
204—turning sheet;
204a—connecting convex head;
204b—turning portion;
204c—fixing portion;
206—current cutting-off structure;
208—connecting plate;
208a—groove;
30—second electrode unit;
40—cell.

The accompanying drawings herein are incorporated in the specification and form a part of the specification, which show embodiments of the present application and are used together with the specification to explain principles of the present application.

DESCRIPTION OF EMBODIMENTS

The present application will be described in further detail through specific embodiments combining the accompanying drawings. The expressions "front", "back", "left", "right", "top" and "bottom" mentioned in the disclosure are all referring to the placement state of the top cover of the power battery and the power battery in the drawings.

Figure 2:
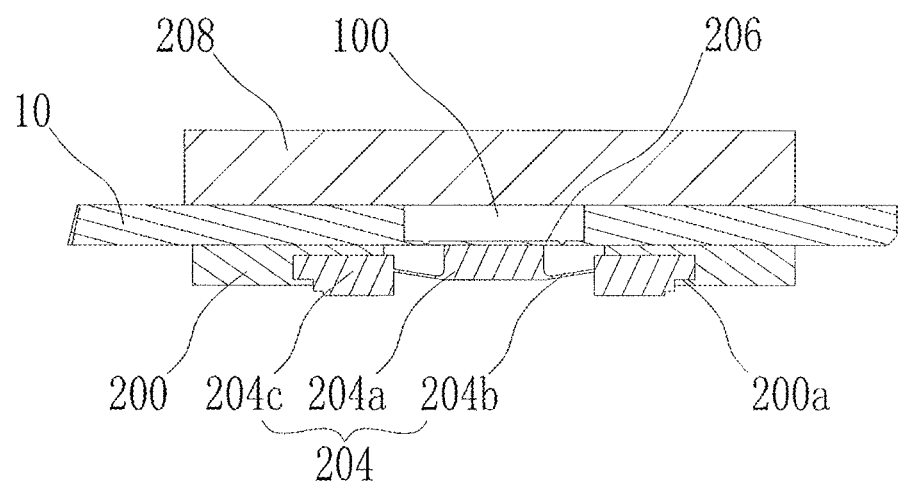
FIG. 2 is a partial enlarged view of section A of the top cover of the power battery in a normal state in FIG. 1, of which a current cutting-off structure is provided at a bottom end of an assembling hole, provided by an embodiment of the present application.
Figure 3:
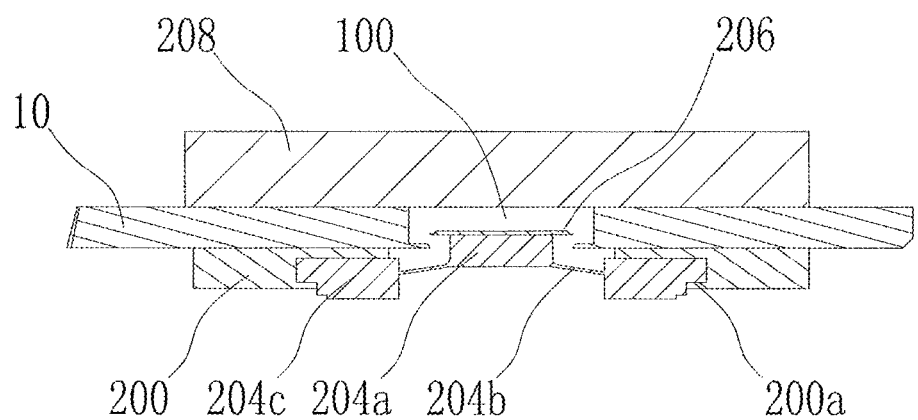
FIG. 3 is a partial enlarged view of section A of the top cover of the power battery in an overcharging protection state in FIG. 1, of which a current cutting-off structure is provided at a bottom end of an assembling hole, provided by an embodiment of the present application.

As shown in FIGS. 1-3, an embodiment of the present application provides a top cover of a power battery, including a top cover sheet 10, a first electrode unit 20 and a second electrode unit 30. The second electrode unit 30 and the top cover sheet 10 are electrically insulated. The first electrode unit 20 includes an insulating piece 200, a turning sheet 204 and a current cutting-off structure 206. In the present embodiment, an assembling hole 100 is provided on the top cover sheet 10, and the current cutting-off structure 206 is fixed in the radial projection range of the assembling hole 100, which can be in the interior of the assembling hole 100, at an end of the assembling hole 100 or even protruding from the assembling hole 100, and is electrically connected with the top cover sheet 10. Several weak regions will be provided on the current cutting-off structure 206, for example providing a circle of nicks, so that the current cutting-off structure 206 breaks down along these weak regions so as to interrupt the current transmission.

The turning sheet 204 is fixed at the underneath of the top cover sheet 10 through an insulating piece 200, with respect to the circuit connection, the turning sheet 204 directly contacts with the bottom of the current cutting-off structure 206 and the two are electrically connected. Thus, in a normal state, the current can be transmitted to the top cover sheet 10 merely through the turning sheet 204 and the current cutting-off structure 206. Meanwhile, when the internal pressure of the power battery exceeds the reference pressure, the turning sheet 204 can turn upward under the action of pressure and, at the same time, push the current cutting-off structure 206 until the current cutting-off structure 206 is damaged along the weak regions and thus loses the current transmitting capacity, so as to achieve the function of overcurrent protection.

In the present embodiment, since the current cutting-off structure 206 is provided in the assembling hole 100 of the top cover sheet 10, without occupying the internal space of the power battery, therefore the volumetric energy density of the power battery can be increased greatly.

In order to guarantee the successful turning of the turning sheet 204, the environments at two sides of the turning sheet 204 should be prevented from connecting with each other. The present embodiment provides the following two solutions.

In the first solution, the current cutting-off structure 206 seals the assembling hole 100. At this time, the environments of the two sides of the current cutting-off structure 206 are not connected with each other; when the internal pressure increases, the pressure suffered by the contacting portion of the turning sheet 204 with the current cutting-off structure 206 is different from the pressure suffered by other portions of the turning sheet 204, which therefore can facilitate turning of the turning sheet 204.

In the second solution, the turning sheet 204 should be sealed with the insulating piece 200, in the meantime, the insulating piece 200 and the top cover sheet 10 are sealed and fixed to prevent air from leaking. Thus the environments at the two sides of the turning sheet 204 are not connected with each other, and the turning sheet 204 can obtain greater turning force. An inserting slot 200a can be provided on the insulating piece 200, and the edge of the turning sheet 204 is inserted in the inserting slot 200a to achieve the sealed connection with the insulating piece 200.

Figure 4:
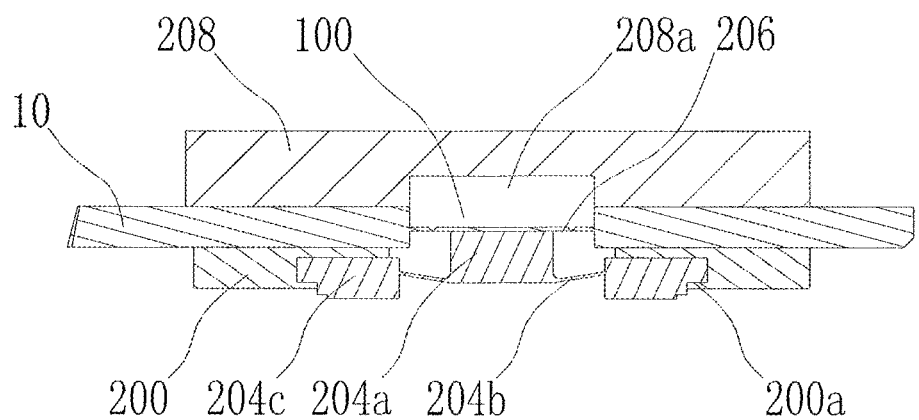
FIG. 4 is a partial enlarged view of section A of the top cover of the power battery in a normal state in FIG. 1, of which a current cutting-off structure is provided in the middle of an assembling hole, provided by an embodiment of the present application.
Figure 5:
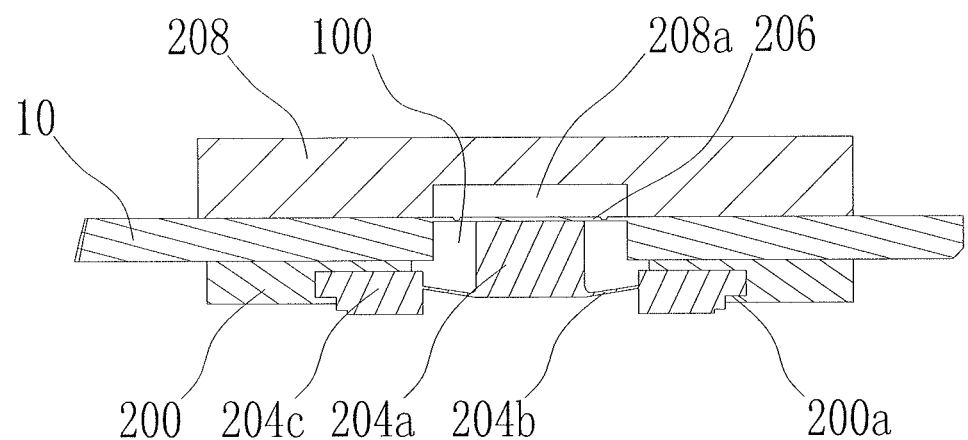
FIG. 5 is a partial enlarged view of section A of the top cover of the power battery in a normal state in FIG. 1, of which a current cutting-off structure is provided on a top end of an assembling hole, provided by an embodiment of the present application.

In order to further facilitate the electrical connection between the first electrode unit 20 and external electrical devices, the first electrode unit 20 in the present embodiment further includes a connecting plate 208 which covers the assembling hole 100. Through covering the assembling hole 100 by the connecting plate 208, the current cutting-off structure 206 can be protected from being punctured by external objects. However, the existence of the connecting plate 208 may limit the damaging action of the current cutting-off structure 206 and cause that the current cannot be completely interrupted. In order to avoid such situation, as shown in FIG. 4 and FIG. 5, in the present embodiment, a groove 208a is provided at the bottom of the connecting plate 208, and the groove 208a is opposite to the assembling hole 100 so as to provide enough space for the current cutting-off structure 206; when the current cutting-off structure 206 is torn along the weak regions under pushing of the turning sheet 204, the portion torn can enter inside the groove 208a without being blocked by the connecting plate 208.

In order to guarantee that the current cutting-off structure 206 has enough space, the projection of the assembling hole 100 in a direction perpendicular to the thickness direction of the top cover sheet 10 is preferred to overlap with or be located in the projection of the groove 208a in the same direction.

In the present embodiment, in order to facilitate manufacturing and assembling, the current cutting-off structure 206 and the top cover sheet 10 can be integrally formed. The position of the current cutting-off structure 206 in the assembling hole 100 can be adjusted according to the demand, for example at the bottom end of the assembling hole 100 (see FIG. 2 and FIG. 3), in the middle (see FIG. 4) or on the top end (see FIG. 5).

As shown in FIG. 2, the turning sheet 204 provided by the present embodiment includes a connecting convex head 204a, a turning portion 204b and a fixing portion 204c, in which, the turning portion 204b is a sheet shaped structure with a ring surface, the fixing portion 204c is fixed and connected with the edge of the turning portion 204b, the fixing portion 204c can be arranged around the turning portion 204b, so as to increase the contacting area with the power battery and, at the same time, enable the connection between the turning sheet 204 and the insulating piece 200 to be tighter and closer.

The connecting convex head 204a is located in the middle of the turning portion 204b. The convex head 204a protrudes toward the lower surface of the current cutting-off structure 206 and contacts with the current cutting-off structure 206. The main function of the connecting convex head 204a is to overcome the distance between the turning sheet 204 and the current cutting-off structure 206, so that the two can get into close contact successfully. The greater the distance between the turning sheet 204 and the current cutting-off structure 206, the greater the length of the connecting convex head 204a. The top end surface of the connecting convex head 204a is preferably a plane, thus the contact with the current cutting-off structure 206 is closer, which provides more effective transmission of acting force and current.

Figure 6:
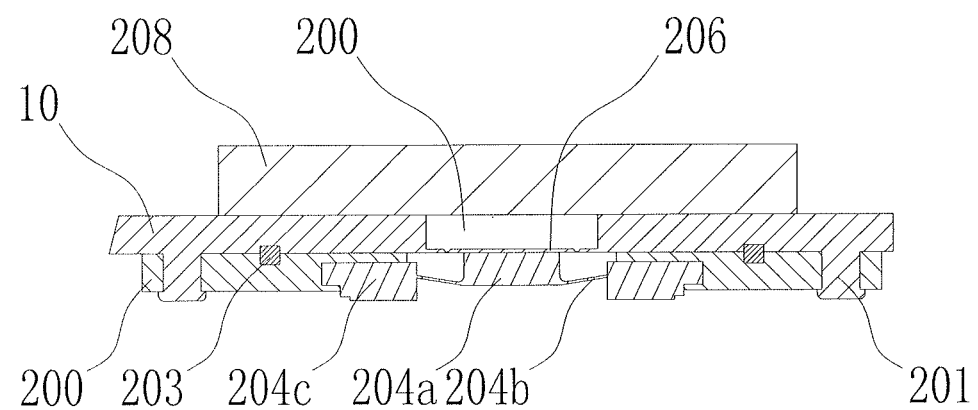
FIG. 6 is a partial enlarged view of section A of the top cover of the power battery in a normal state in FIG. 1, which adopts a sealing ring and a connecting piece, provided by an embodiment of the present application.

In the present embodiment, since it is needed to guarantee the sealing between the insulating piece 200 and the top cover sheet 10, the connecting structure between the insulating piece 200 and the top cover sheet 10 is extremely important. A simple way is to adhere and fix the insulating piece 200 and the top cover sheet 10. In addition, as shown in FIG. 6, the insulating piece 200 and the top cover sheet 10 can also be connected by the connecting piece 201. When connecting by the connecting piece 201, a connecting piece fitting portion (unlabeled in the figures) can be provided on the insulating piece 200 or the top cover sheet 10, such as stepped hole, clamping slot, clamping hole, rivet hole and so on (the rivet hole is adopted in FIG. 6), and the connecting piece 201 can adopt rivet, buckling piece or even hot melt column structure and so on (the rivet is adopted in FIG. 6) to fit and connect with those connecting piece fitting portions, so as to realize the fitting and fixing. In some embodiments, in order to further improve the sealing effect, sealing structures such as sealing ring 203 and so on can be provided between the insulating piece 200 and the top cover sheet 10 to facilitate sealing the gap between the insulating piece 200 and the top cover sheet 10.

Figure 7:
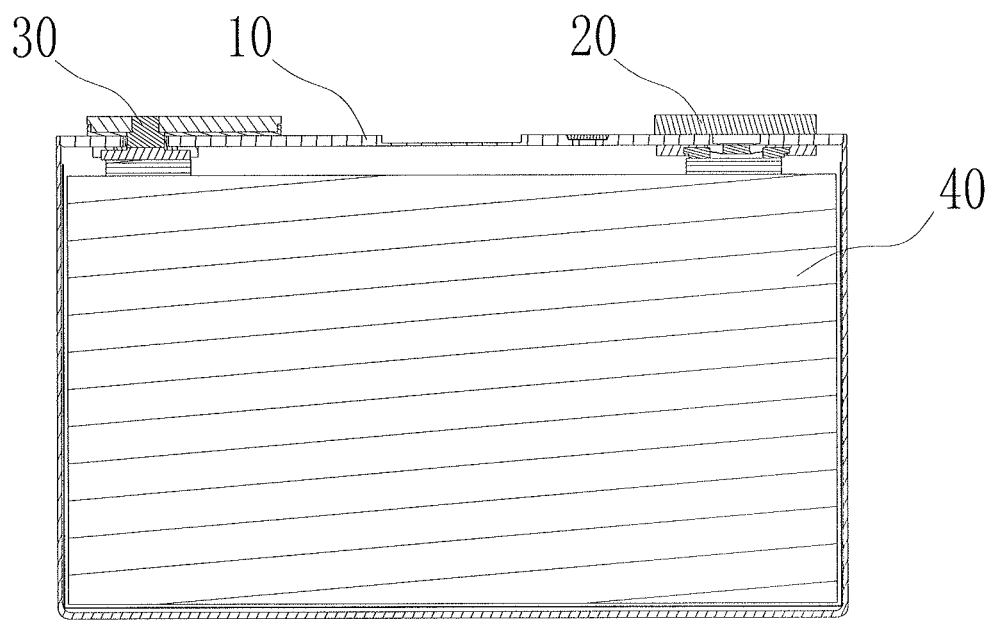
FIG. 7 is a schematic view of an integral structure of a power battery provided by an embodiment of the present application.

The present embodiment also provides a power battery, as shown in FIG. 7, including a cell 40 and the top cover of the power battery mentioned in the above embodiments, the cell 40 needs to be electrically connected with the turning sheet 204. The top cover of the power battery can improve the energy density of the power battery.

The above-mentioned are merely preferred embodiments of the present application, which are not used to limit the present application, for the person skilled in the art, the present application can have a variety of modifications and variations. Any modifications, equivalent replacements and improvements made within the spirit and principle of the present application shall fall in the protection scope of the present application.

What is claimed is:

1. A top cover of a power battery, comprising a top cover sheet, a first electrode unit and a second electrode unit, wherein,
the first electrode unit comprises a turning sheet, an insulating piece and a current cutting-off structure,
an assembling hole is provided on the top cover sheet, the current cutting-off structure is fixed in a radial projection range of the assembling hole, and is electrically connected with the top cover sheet,
the turning sheet is fixed at an underneath of the top cover sheet through the insulating piece, the turning sheet is electrically connected with the top cover sheet merely through the current cutting-off structure,
the second electrode unit is electrically insulated from the top cover sheet, and the turning sheet is capable of turning and breaking the current cutting-off structure when an internal pressure of the power battery exceeds a reference pressure, so as to cut off an electrical connection of the current cutting-off structure with the top cover sheet,
the insulating piece is sealed and fixed with the top cover sheet, and the turning sheet is sealed and fixed with the insulating piece, and
the first electrode unit further comprises a sealing ring, wherein the sealing ring is provided between the insulating piece and the top cover sheet, and seals a gap between the insulating piece and the top cover sheet.

2. The top cover of the power battery according to claim 1, wherein, the turning sheet directly contacts with a bottom of the current cutting-off structure.

3. The top cover of the power battery according to claim 1, wherein, the current cutting-off structure seals the assembling hole.

4. The top cover of the power battery according to claim 1, wherein, the first electrode unit further comprises a connecting plate,
wherein the connecting plate covers the assembling hole and is electrically connected with the top cover sheet.

5. The top cover of the power battery according to claim 4, wherein, a groove is provided at a bottom of the connecting plate, and the groove is opposite to the assembling hole.

6. The top cover of the power battery according to claim 5, wherein, a projection of the assembling hole in a direction perpendicular to a thickness direction of the top cover sheet overlaps with or is located within a projection of the groove in a same direction.

7. The top cover of the power battery according to claim 1, wherein, the turning sheet comprises a fixing portion, a connecting convex head and a turning portion,
wherein the turning portion is a sheet shaped structure with a ring surface, the fixing portion is fixed and connected with an edge of the turning portion, the connecting convex head is located in the middle of the turning portion, protrudes toward a lower surface of the current cutting-off structure and contacts with the current cutting-off structure.

8. The top cover of the power battery according to claim 1, wherein, the current cutting-off structure and the top cover sheet are integrally formed.

9. The top cover of the power battery according to claim 1, wherein, the insulating piece is adhered to the top cover sheet.

10. The top cover of the power battery according to claim 1, wherein, further comprising a connecting piece, wherein the insulating piece is connected with the top cover sheet through the connecting piece.

11. The top cover of the power battery according to claim 10, wherein, a connecting piece fitting portion is provided on the insulating piece and/or the top cover sheet, and the connecting piece is fitted and fixed with the connecting piece fitting portion.

12. The top cover of the power battery according to claim 1, wherein, an inserting slot is provided on the insulating piece, and an edge of the turning sheet is inserted in the inserting slot and is sealed and connected with the inserting slot.

13. A power battery, comprising a cell and the top cover of the power battery according to claim 1, wherein the cell is electrically connected with the turning sheet.

* * * * *